Patented July 11, 1933

1,918,233

UNITED STATES PATENT OFFICE

GRAY SINGLETON, OF FORT MEADE, AND ROBERT P. THORNTON, OF LAKELAND, FLORIDA

FERTILIZER MATERIAL AND PROCESS OF PREPARING THE SAME

No Drawing.    Application filed April 8, 1930.    Serial No. 442,679.

This invention relates to a new fertilizer material and the process of preparing the same.

Cyanamid materials such as calcium cyanamid have been used for preparing fertilizers by mixing the cyanamid with various substances and permitting reaction to take place to form materials suitable for use as fertilizers. The materials prepared in the past have often been expensive to manufacture or have not had the fertilizer materials in the most desirable and available forms.

It is one of the objects of the present invention to prepare a fertilizer material having a high content of available nitrogen and possessing very beneficial properties. It is a further object to prepare fertilizers containing nitrogenous compounds which are easily decomposed and readily lend themselves to assimilation in the soil with consequent absorption by the plants to be fertilized.

We have discovered that these and other objects may be attained by the admixture of a cyanamid material, such as calcium cyanamid, with fruit pulp, and allowing a reaction to take place between these materials to form a fertilizer containing substantially no cyanamid or dicyandiamid, the nitrogen present being substantially entirely in the form of urea.

One specific method of preparing our fertilizer, given merely by way of illustration and not in limitation, comprises admixing 200 lbs. of calcium cyanamid with a ton of finely shredded pulp of citrus fruit such as orange, lemon and grapefruit culls and dropped fruit. A chemical reaction begins to take place immediately with a rise in temperature. The mixture is stored in a suitable place and the temperature continues to rise until it reaches about 170° to 210° F. The hydrogen ion concentration of the pulp prior to admixture was about $10^{-3.5}$ and the reaction of the materials in the mixture is complete in about three days. The finished material is in the nature of a moist mass which may be dried, if desired, in any suitable manner and is then ready for use.

To avoid the final step of drying, we find it advantageous to add to the initial mix about 200 lbs. of peat per ton of pulp. The mixture then attains a somewhat higher temperature and at the end of the reaction the pulp is in the form of a substantially dry powder which may be used without further drying.

The finished fertilizer contains about 8% of nitrogen calculated as ammonia and on the basis of 10% moisture in the finished product. The finished fertilizer has an appreciable odor of ammonia but analyses have shown that there is no appreciable loss of nitrogen. The fertilizer retains substantially all of the nitrogen in the form of urea and contains no dicyandiamid and substantially no other nitrogenous compounds in which the nitrogen is held in unavailable form. Furthermore, any nitrogen contained in the fruit pulp and peat is also in available form.

The fertilizer prepared as above may be used in the customary manner, either alone or admixed with other fertilizer materials and does not cause reversion of phosphoric acid.

In place of the calcium cyanamid mentioned, we may use other cyanamid materials, in either the pure or crude form, the bases of which are not injurious to plant life. Among these may be mentioned the acid cyanamids, the other alkali earth metal cyanamids, such as those of barium and strontium, the alkali metal cyanamids such as sodium and potassium, and the like.

Any fruit pulp may be used in preparing the fertilizers and among those which have been tried out with success are pineapples, peaches, apples, plums, grapes, all types of citrus fruits, etc. The fruits may be in varying stages of ripeness or decomposition. The fruit pulp is prepared in any suitable manner and is preferably obtained in the finest condition by such means as shredding, or the like. The hydrogen ion concentration of the various types of pulp differs in accordance with the fruit originally utilized. The higher the hydrogen ion concentration, the more quickly the reaction between the pulp and cyanamid is brought to completion. Likewise, the nature of the pulp determines in some measure the proportions of cyanamid which may economically be mixed with the pulp. Under ordinary circumstances it is usually inadvisable to prepare mixtures containing less than 100 to 150 lbs. of cyanamid per ton of pulp. Ordinarily, larger amounts of cyanamid are used up to about 500 lbs. of cyanamid per ton of pulp, and in some cases even more cyanamid may be used and complete conversion obtained. Ordinarily, it is undesirable to use more cyanamid than can be converted to urea since any excess cyanamid in the finished material has a deleterious effect on the plant life under certain soil conditions.

Our method of preparing our fertilizer mixtures is particularly valuable in view of the fact that we are able to utilize waste fruits, regardless of their condition. Furthermore, we are able to utilize successfully the fruits which are infested with various insect pests, such as the Mediterranean fruit fly, scale insects, circulio, and the like. Ordinarily it is a practice to dispose of the infested fruit by one of several costly and tedious methods as required by law. However, by the present method of utilizing the fruit for fertilizer materials the insect life is entirely destroyed, and in the case of the Mediterranean fruit fly, the eggs, larvæ, and pupæ are entirely destroyed during the process of preparing the fertilizer. This effect is quite evident due to the toxic properties of the mixture and not solely by the heat generated by the chemical reaction which takes place. In a series of tests we have found that a fertilizer mixture which was prepared and allowed to cool and stand for three weeks was capable of destroying within forty-eight hours, all eggs, larvæ and pupæ of the Mediterranean fruit fly which were introduced into the mixture. The same effect was observed on the circulio in peaches.

The process forming part of the present invention is truly a chemical reaction, and the transformation of cyanamid to urea is not dependent upon any bacteriological action, particularly in view of the fact that the original mix heats up to such temperatures as to completely sterilize the mix and effectively destroy any bacteria or the like. The citrus and other fruits contain acids and acid salts, which act in a buffer capacity to automatically maintain the hydrogen ion concentration at a favorable point for the rapid and complete conversion of the cyanamid materials into the more desirable and useful urea.

It is quite obvious that many changes may be made in details of operation and the like without departing from the spirit and scope of the invention except as set forth in the appended claims.

What we claim is:

1. The process of preparing fertilizer materials which comprises mixing a cyanamid material with a fruit pulp and allowing a reaction to take place until substantially all of the cyanamid material is converted into urea.

2. The process of preparing a fertilizer which comprises mixing calcium cyanamid with fruit pulp and allowing a reaction to take place until substantially all of the cyanamid is converted to urea.

3. The process of preparing a fertilizer which comprises mixing crude calcium cyanamid with fruit pulp and allowing a reaction to take place until substantially all of the cyanamid is converted to urea.

4. The process of preparing a fertilizer which comprises mixing calcium cyanamid with a citrus fruit pulp and allowing a reaction to take place until substantially all of the cyanamid is converted into urea.

5. The process of preparing a fertilizer which comprises mixing at least 150 lbs. of calcium cyanamid with a ton of fruit pulp and permitting a reaction to take place until substantially all of the cyanamid is converted into urea.

6. The process of preparing a fertilizer which comprises mixing 150 to 500 lbs. of calcium cyanamid with a ton of citrus fruit pulp and allowing a reaction to take place until substantially all of the cyanamid is converted into urea.

7. The process of preparing a fertilizer which comprises mixing a cyanamid material with a fruit pulp and allowing a reaction to take place until substantially all of the cyanamid material is converted into urea.

8. The process of preparing a fertilizer which comprises mixing 150 to 500 lbs. of a cyanamid material with about 200 lbs. of peat and one ton of fruit pulp, and allowing a reaction to take place until substantially all of the cyanamid is converted into urea.

9. A fertilizer material comprising a reaction product of fruit pulp with a cyanamid material.

10. A fertilizer material comprising the product of reaction of calcium cyanamid with fruit pulp.

11. A fertilizer material comprising the product of reaction of not less than 150 lbs. of calcium cyanamid with a ton of fruit pulp.

12. A fertilizer material comprising the product of reaction of 150 to 500 lbs. of calcium cyanamid with a ton of citrus fruit pulp.

13. A fertilizer material comprising the product of reaction of a cyanamid material with fruit pulp, said fertilizer containing nitrogen in the form of urea with substantially no dicyandiamid.

14. A fertilizer material comprising the product of reaction of a cyanamid material with fruit pulp in the presence of peat.

15. A fertilizer material comprising the product of reaction of 150 to 500 lbs. of a cyanamid material with a ton of fruit pulp in the presence of about 200 lbs. of peat.

16. A material comprising the chemical reaction product of a citrus fruit pulp and calcium cyanamid at a temperature of approximately 170 to 210° F.

GRAY SINGLETON.
ROBERT P. THORNTON.